United States Patent
Cheng (10) Patent No.: US 9,844,822 B2
(45) Date of Patent: Dec. 19, 2017

(54) MULTI-LINK MITER SAW

(71) Applicant: Rexon Industrial Corp., Ltd., Taichung (TW)

(72) Inventor: Chih Ming Cheng, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 2 days.

(21) Appl. No.: 14/850,147

(22) Filed: Sep. 10, 2015

(65) Prior Publication Data

US 2016/0067801 A1 Mar. 10, 2016

Related U.S. Application Data

(60) Provisional application No. 62/048,445, filed on Sep. 10, 2014.

(30) Foreign Application Priority Data

Sep. 11, 2014 (TW) .............................. 103131392 A (51) Int. Cl.
| | | |
|---|---|---|
| *B23D 45/04* | (2006.01) | |
| *B23D 47/02* | (2006.01) | |
| *B27B 5/18* | (2006.01) | |
| *B27B 5/20* | (2006.01) | |
| *B23D 47/00* | (2006.01) | |

(52) U.S. Cl.
CPC ........... *B23D 47/02* (2013.01); *B23D 45/044* (2013.01); *B23D 47/005* (2013.01); *B27B 5/188* (2013.01); *B27B 5/208* (2013.01); *Y10T 83/7693* (2015.04); *Y10T 83/7697* (2015.04); *Y10T 83/7763* (2015.04); *Y10T 83/7772* (2015.04)

(58) Field of Classification Search
CPC .... B23D 45/044; B23D 47/005; B23D 47/02; B23D 45/048; B27B 5/208; B27B 5/188; B23Q 1/5481; Y10T 83/7693; Y10T 83/7697; Y10T 83/7705; Y10T 83/7726; Y10T 83/7763; Y10T 83/7768; Y10T 83/7772; Y10T 83/7788; Y10T 83/8773; Y10T 83/8845
USPC ........ 83/471.2, 471.3, 473, 477.1, 485, 486, 83/486.1, 490, 581, 630; 144/4.3; 248/277.1

See application file for complete search history.

(56) References Cited

U.S. PATENT DOCUMENTS 1,707,764 A * 4/1929 Mattison ................. B27B 5/208
                                                                                              248/277.1
1,763,244 A * 6/1930 Mattison ................. B27B 5/188
                                                                                              83/486

(Continued)

Primary Examiner — Clark F Dexter
(74) Attorney, Agent, or Firm — Bacon & Thomas, PLLC (57) ABSTRACT

A multi-link miter saw includes a base, a table supported on the base, a supporting unit connected to the table, a linkage unit connected to the supporting unit, a cantilever arm unit including a cantilever arm pivotally connected to the linkage unit and a connection member pivotally connected between the cantilever arm and the linkage unit for enabling the cantilever arm to be driven by the linkage unit and the connection member to move along a horizontal axis between the rear edge and front edge of the base, and a cutting unit pivotally connected to the cantilever arm unit. Based on the arrangement of the linkage unit and the cantilever arm unit, the cutting unit can be moved smoothly relative to the table, thus enhancing operation stability.

4 Claims, 6 Drawing Sheets

(56) References Cited

U.S. PATENT DOCUMENTS

| | | | | |
|---|---|---|---|---|
| 1,765,733 | A * | 6/1930 | Olsen | B27B 5/208 |
| | | | | 144/4.3 |
| 2,007,563 | A * | 7/1935 | DeKoning | B23Q 1/5481 |
| | | | | 83/486.1 |
| 2,535,182 | A * | 12/1950 | Weaver | B27B 5/188 |
| | | | | 144/136.1 |
| 2,569,354 | A * | 9/1951 | Tracy | B23Q 1/5481 |
| | | | | 144/135.4 |
| 5,257,570 | A | 11/1993 | Shiotani et al. | |
| 5,791,224 | A | 8/1998 | Suzuki et al. | |
| 8,322,261 | B2 | 12/2012 | Liu et al. | |
| 8,499,672 | B2 | 8/2013 | Oberheim | |
| 8,522,657 | B2 * | 9/2013 | Oohama | B27B 5/188 |
| | | | | 83/471.3 |
| 2007/0113718 | A1 * | 5/2007 | Oberheim | B23D 45/048 |
| | | | | 83/471.3 |
| 2007/0137452 | A1 * | 6/2007 | Oberheim | B23D 45/048 |
| | | | | 83/471.3 |
| 2007/0151434 | A1 * | 7/2007 | Oberheim | B23D 45/048 |
| | | | | 83/581 |
| 2010/0058909 | A1 * | 3/2010 | Chen | B23D 45/044 |
| | | | | 83/471.3 |
| 2010/0212467 | A1 * | 8/2010 | Oohama | B27B 5/188 |
| | | | | 83/471.2 |
| 2010/0275755 | A1 * | 11/2010 | Cox | B23Q 11/06 |
| | | | | 83/471.3 |
| 2012/0006169 | A1 * | 1/2012 | Oberheim et al. | B23D 45/048 |
| | | | | 83/471.2 |
| 2012/0011978 | A1 * | 1/2012 | Liu | B23D 45/048 |
| | | | | 83/471.2 |
| 2012/0017736 | A1 * | 1/2012 | Thomas et al. | B23D 45/048 |
| | | | | 83/471.2 |
| 2012/0017737 | A1 * | 1/2012 | Liu et al. | B23D 45/048 |
| | | | | 83/471.3 |

* cited by examiner

MULTI-LINK MITER SAW

BACKGROUND OF THE INVENTION

1. Field of the Invention

The present invention relates to processing machinery, and more particularly, to a multi-link miter saw.

2. Description of the Related Art

A conventional slider-based miter saw is known comprising a base, a table mounted at the base, a support frame connected to a rear side of the table, a slider unit linearly movable along the support frame, and a cutting unit connected to the slider unit. Subject to the mating arrangement between the support frame and the slider unit, the cutting unit can be pulled forwards to perform a cutting stroke, thus achieving a cutting operation.

The above prior art slider-based miter saw is applicable to processing operations that require a cutting stroke. However, because the slider unit needs to make a back and forth stroke, the surroundings around the work area must be kept clear to avoid interference. Thus, this design of such a slider-based miter saw requires a lot of installation space. Further, because the cutting unit has a heavy weight, the slider unit can be vibrated relative to the support frame during the operation, thus resulting in noises.

U.S. Pat. No. 8,499,672 discloses a power miter saw, which comprises a saw base, a table rotatably connected to the saw base, a miter arm assembly for angularly positioning the table relative to the saw base, a saw blade and motor assembly operatively connected to the table, and a linear guide mechanism attached to the table and being configured to support the saw blade and motor assembly and enable movement of the assembly along a predetermined linear path in either forward or rearward directions. During an extending or receiving action of the miter arm assembly, the linear guide mechanism is driven to extend out or retract horizontally. However, due to single point pivot connection arrangement of the miter arm assembly and the linear guide mechanism relative to the saw base, the overall structure is disadvantageously less stable during the cutting stroke of the cutting unit.

SUMMARY OF THE INVENTION

The present invention has been accomplished under the circumstances in view. It is the main object of the present invention to provide a multi-link miter saw, which has a simple structure and greatly enhances structural stability.

To achieve this and other objects of the present invention, a multi-link miter saw comprises a base, a table, a supporting unit, a linkage unit, a cantilever arm unit, and a cutting unit. The base comprises a front edge and an opposing rear edge. The table is mounted at the base, comprising an axle holder disposed corresponding to the rear edge. The supporting unit is disposed corresponding to the rear edge, and connected to the axle holder of the table. The linkage unit is connected to the supporting unit and swingeable between the rear edge and front edge of the base. The cantilever arm unit is pivotally connected to the linkage unit, comprising a cantilever arm pivotally connected to the linkage unit and a connection member pivotally connected between the cantilever arm and the linkage unit. Thus, the cantilever arm can be driven by the linkage unit and the connection member to move along a horizontal axis between the rear edge and front edge of the base. The cutting unit comprises a saw blade holder pivotally connected to the cantilever arm unit, and a saw blade pivotally mounted in the saw blade holder.

Based on the arrangement of the linkage unit and the cantilever arm unit, the cutting unit can be moved smoothly relative to the table, thus advantageously enhancing operation stability.

Other advantages and features of the present invention will be fully understood by reference to the following specification in conjunction with the accompanying drawings, in which like reference signs denote like components of structure.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate an exemplary embodiment of the present invention and the components thereof, and in no way limits the structures, configurations and components thereof according to the present disclosure.

DETAILED DESCRIPTION OF THE INVENTION

Figure 1:
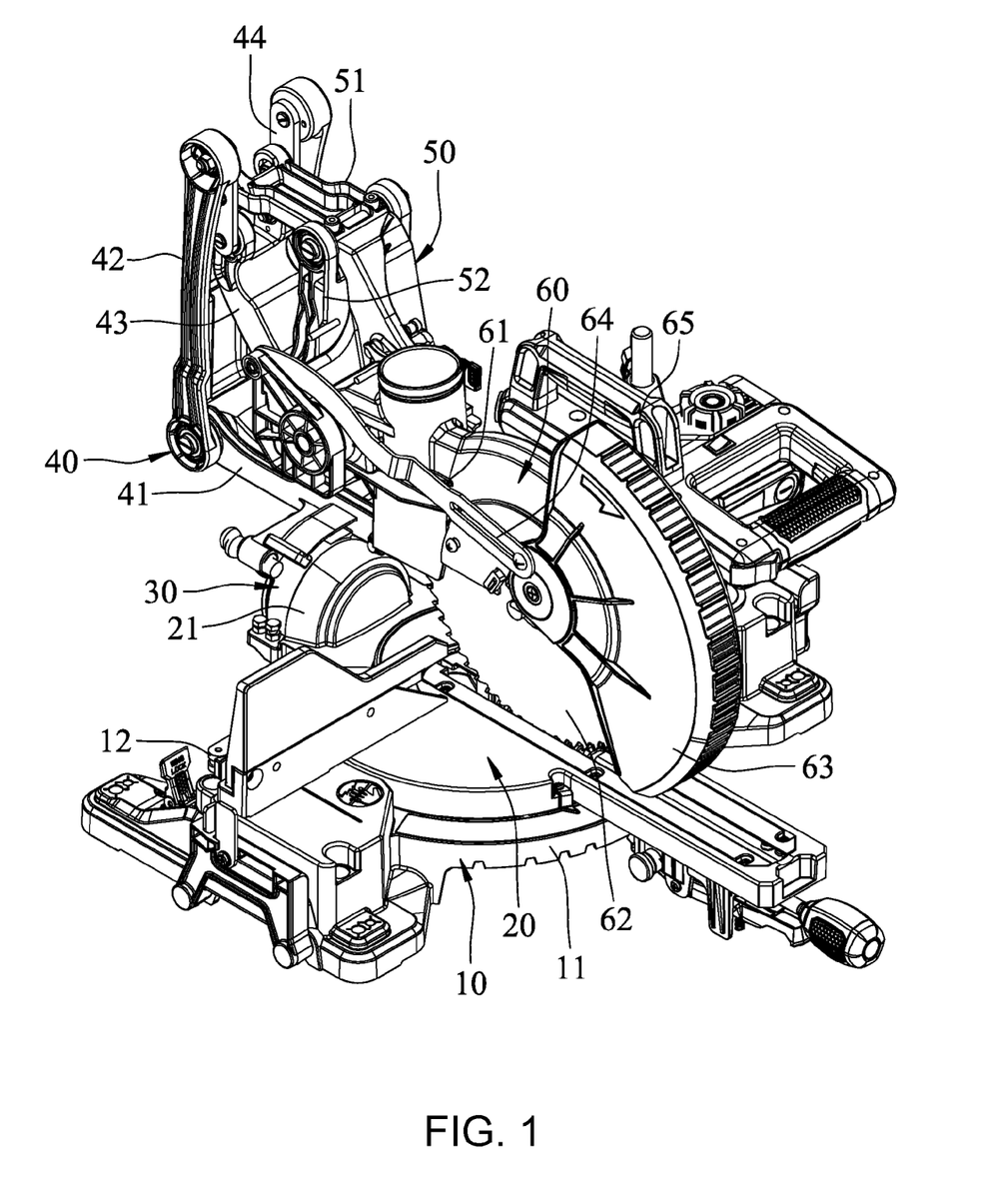
FIG. 1 is perspective view of a multi-link miter saw in accordance with the present invention.
Figure 2:
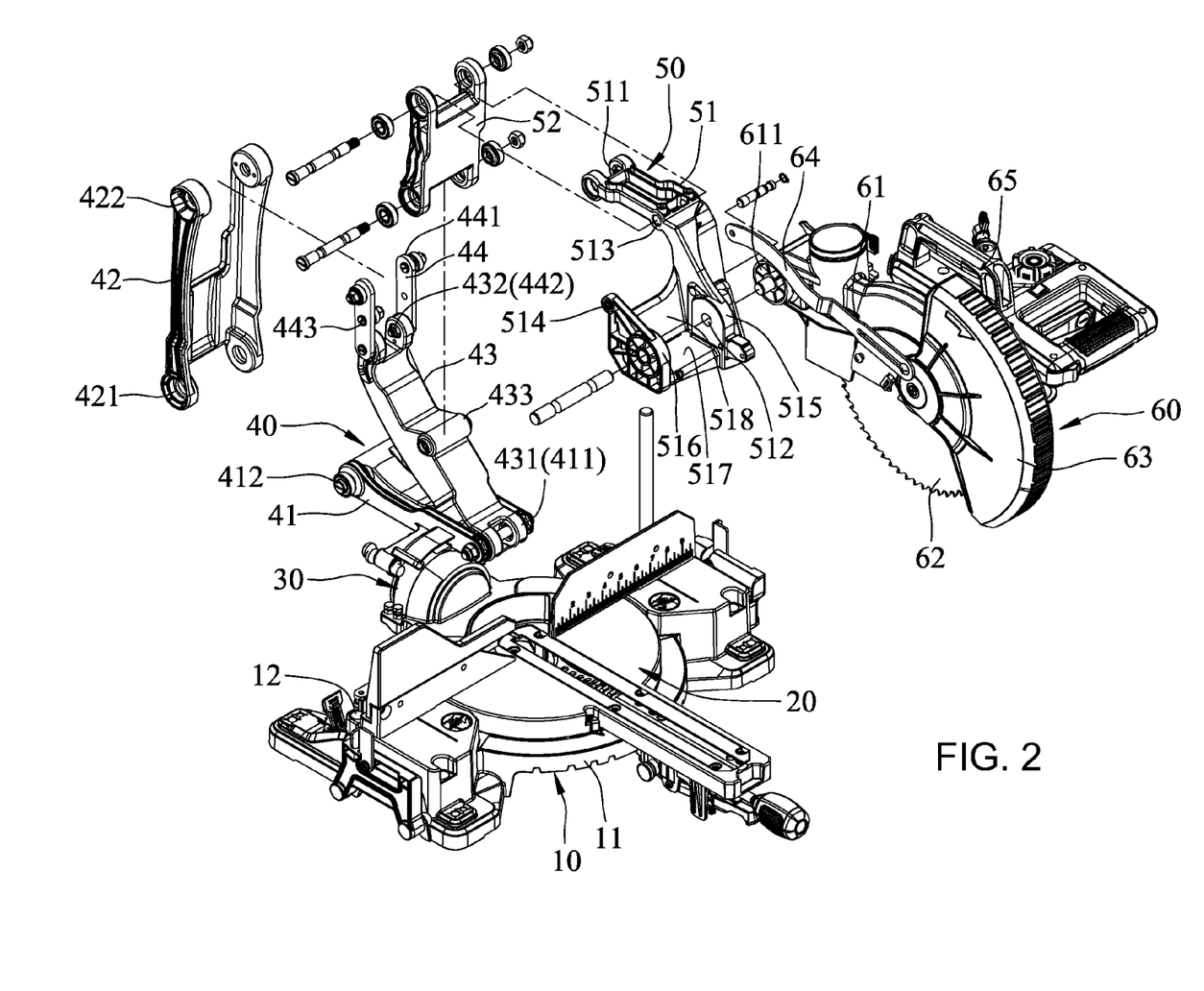
FIG. 2 is an exploded perspective view of the multi-link miter saw in accordance with the present invention.
Figure 3:
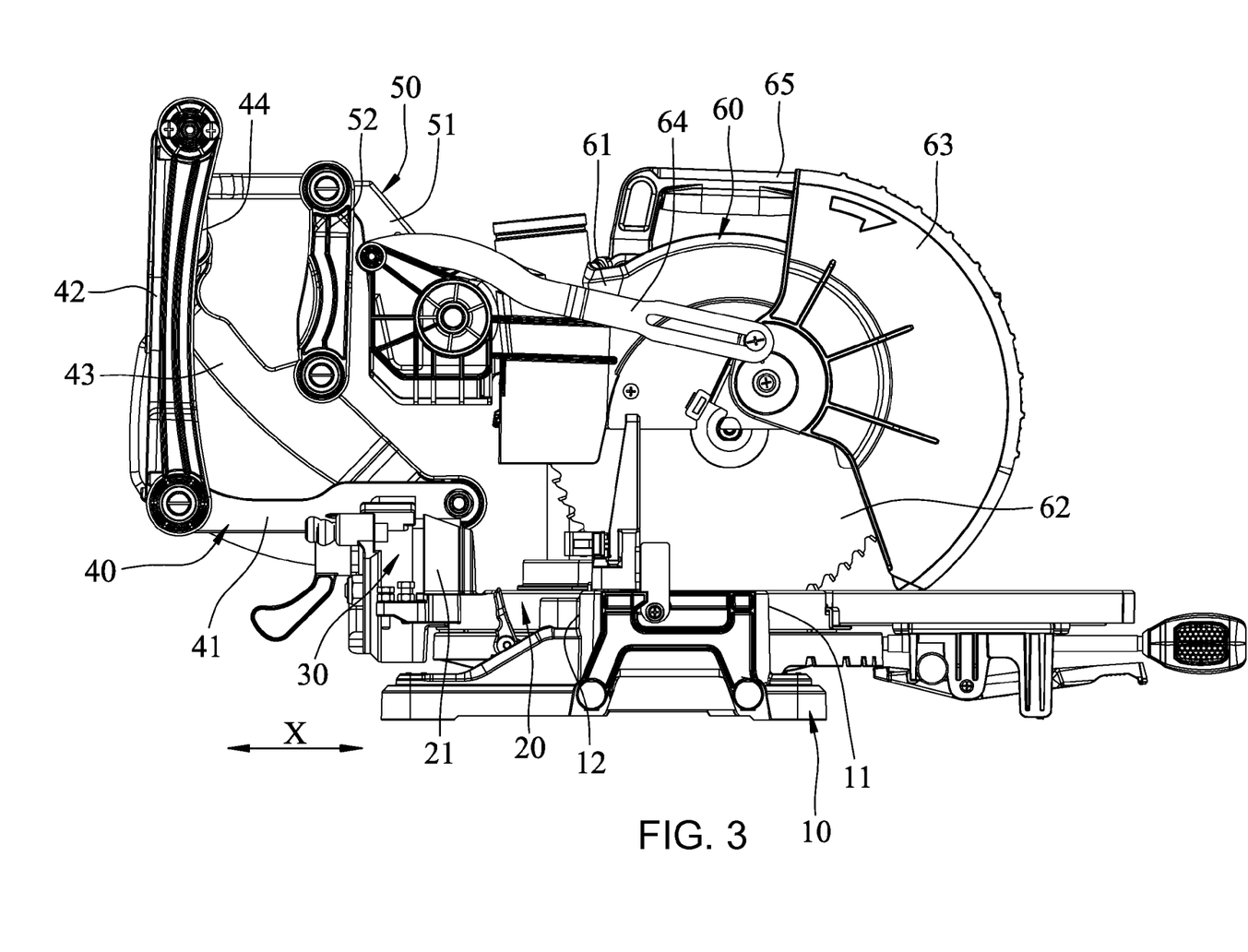
FIG. 3 is a side elevation view of the present invention, illustrating the cutting unit in a received position.

Referring to FIGS. 1, 2 and 3, a multi-link miter saw in accordance with the present invention is shown. The multi-link miter saw comprises a base 10, a table 20, a supporting unit 30, a linkage unit 40, a cantilever arm unit 50, and a cutting unit 60.

The base unit 10 comprises a front edge 11, and a rear edge 12 disposed opposite to the front edge 11.

The table 20 is rotatably mounted on the base 10, and comprises an axle holder 21 corresponding to the rear edge 12 of the base unit 10.

The supporting unit 30 is rotatably connected to the axle holder 21 of the table 20 corresponding to the rear edge 12 of the base unit 10.

The linkage unit 40 is a four-bar linkage mechanism connected to the supporting unit 30 and movable between the rear edge 12 and front edge 11 of the base unit 10. In this embodiment, the linkage unit 40 comprises a first link 41 connected to the supporting unit 30, a second link 42 pivotally connected to the first link 41, a third link 43 corresponding to the second link 42 and pivotally connected to the first link 41, and a fourth link 44 pivotally connected between the second link 42 and the third link 43.

The first link 41 is an elongated bar comprising a first pivot-connection portion 411 disposed adjacent to the axle holder 21 and an opposite second pivot-connection portion 412 pivotally connected to the second link 42.

The second link 42 comprises a lower rotating portion 421 pivotally connected to the second pivot-connection portion 412, and an upper rotating portion 422 disposed opposite to the lower rotating portion 421.

The third link 43 comprises a lower pivot-connection portion 431 pivotally connected to the first pivot-connection portion 411, an upper pivot-connection portion 432 disposed opposite to the lower pivot-connection portion 431 and pivotally connected to the fourth link 44, and a middle pivot-connection portion 433 disposed between the lower pivot-connection portion 431 and the upper pivot-connection portion 432.

The fourth link 44 comprises a first pivoting portion 441 pivotally connected to the upper rotating portion 422, a second pivoting portion 442 disposed opposite to the first pivoting portion 441 and pivotally connected to the upper pivot-connection portion 432, and a coupling portion 443 disposed between the first pivoting portion 441 and the second pivoting portion 442.

The cantilever arm unit 50 is pivotally connected to the linkage unit 40, comprising a cantilever arm 51 pivotally connected to the linkage unit 40 and a connection member 52 pivotally connected between the cantilever arm 51 and the linkage unit 40. The cantilever arm 51 is drivable by the linkage unit 40 and the connection member 52 to move along a horizontal axis X between the rear edge 12 and front edge 11 of the base unit 10. The cantilever arm 51 is pivotally connected to the fourth link 44 of the linkage unit 40. The connection member 52 is pivotally connected between the cantilever arm 51 and the middle pivot-connection portion 433 of the third link 43 of the linkage unit 40. The cantilever arm 51 comprises an interlocking portion 511 pivotally connected to the coupling portion 443 of the fourth link 44, a pivot bearing portion 512 disposed opposite to the interlocking portion 511 for the connection of the cutting unit 60 pivotally, a pivot portion 513 disposed between the interlocking portion 511 and the pivot bearing portion 512, an actuation portion 514 disposed between the pivot bearing portion 512 and the pivot portion 513, a first sidewall 515 and an opposing second sidewall 516 disposed around the pivot bearing portion 512, a substantially L-shaped panel 517 connected between the first sidewall 515 and the second sidewall 516, and an accommodation chamber 518 surrounded by the first sidewall 515, the second sidewall 516 and the L-shaped panel 517. The connection member 52 is pivotally connected between the middle pivot-connection portion 433 of the third link 43 of the linkage unit 40 and the pivot portion 513 of the cantilever arm 51.

The cutting unit 60 comprises a saw blade holder 61 pivotally connected to the cantilever arm unit 50, a saw blade 62 pivotally mounted in the saw blade holder 61, a saw blade guard 63 pivotally connected to the saw blade holder 61 around the saw blade 62, a pull bar 64 pivotally connected between the actuation portion 514 and the saw blade guard 63, and a handle 65 positioned relative to the saw blade holder 61. The saw blade holder 61 comprises a side end portion 611 accommodated in the accommodation chamber 518 and pivotally connected to the pivot bearing portion 512. Thus, the side end portion 611 is disposed between the first sidewall 515 and the second sidewall 516.

As illustrated in FIG. 3, when the saw blade 62 is disposed in a received position after a cutting operation is performed (i.e., at the end of the cutting stroke), the saw blade 62 of the cutting unit 60 is disposed in close proximity to the table 20 and the axle holder 21; the second link 42 and the connection member 52 are substantially disposed vertically relative to the horizontal axis X; the third link 43 is disposed in a backwardly and upwardly tilted manner relative to the rear edge 12; the cantilever arm 51 of the cantilever arm unit 50 substantially extends along the horizontal axis X.

Figure 4:
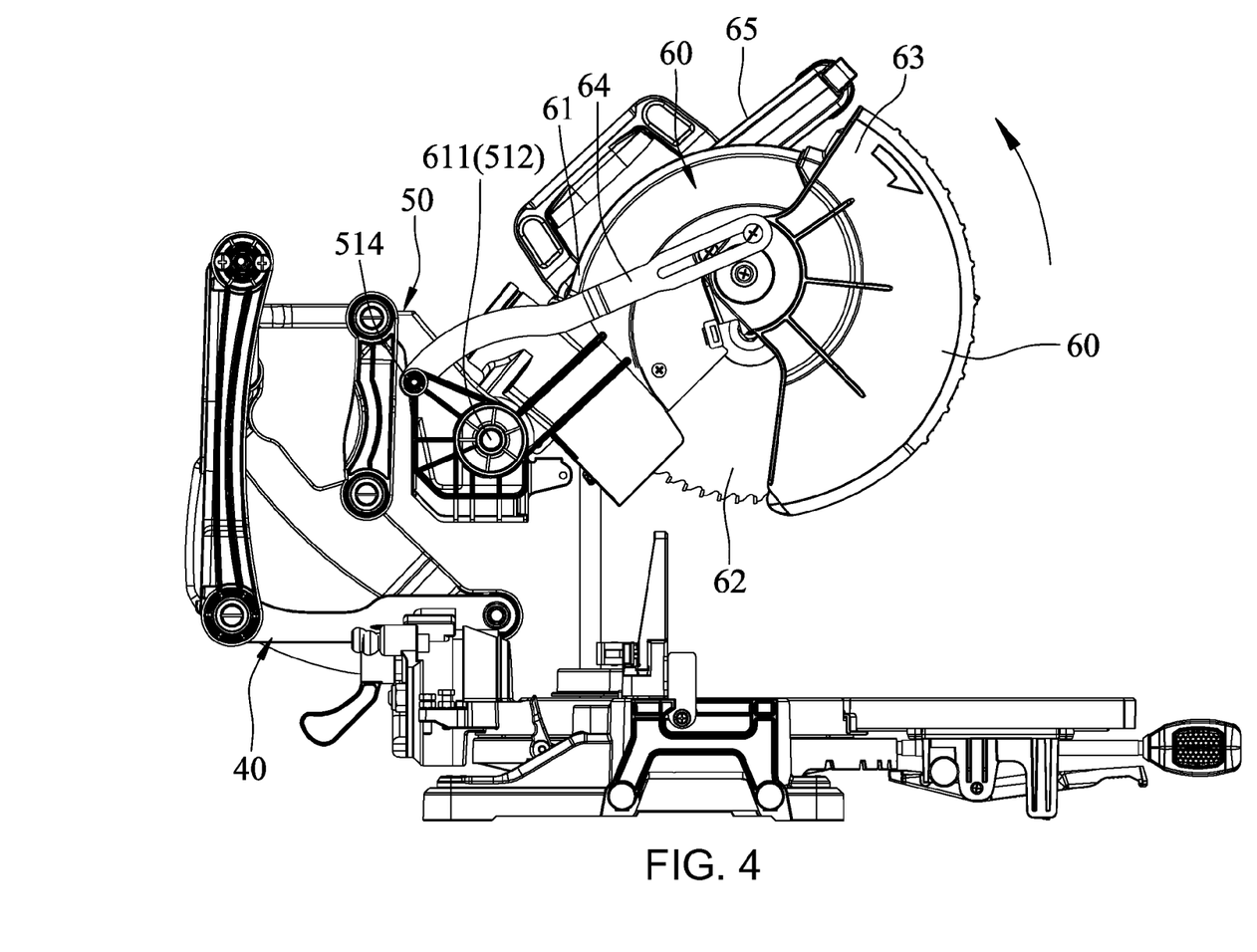
FIG. 4 is a side elevation view of the present invention, illustrating the cutting unit in a ready position for cutting.

When the operator is going to start a cutting operation, as shown in FIG. 4, the operator can operate the handle 65 to lift the cutting unit 60 (in the direction indicated by the arrowhead) and to further bias the side end portion 611 of the cutting unit 60 upwardly relative to the pivot bearing portion 512. Due to the pull bar 64 being pivotally connected between the actuation portion 514 and the saw blade guard 63, the pull bar 64 is forced to bias the saw blade guard 63 relative to the saw blade holder 61 at this time such that the saw blade 62 is shielded. Thus, at this time, the cutting unit 60 is located in a ready position which is away from the table 20.

Figure 5:
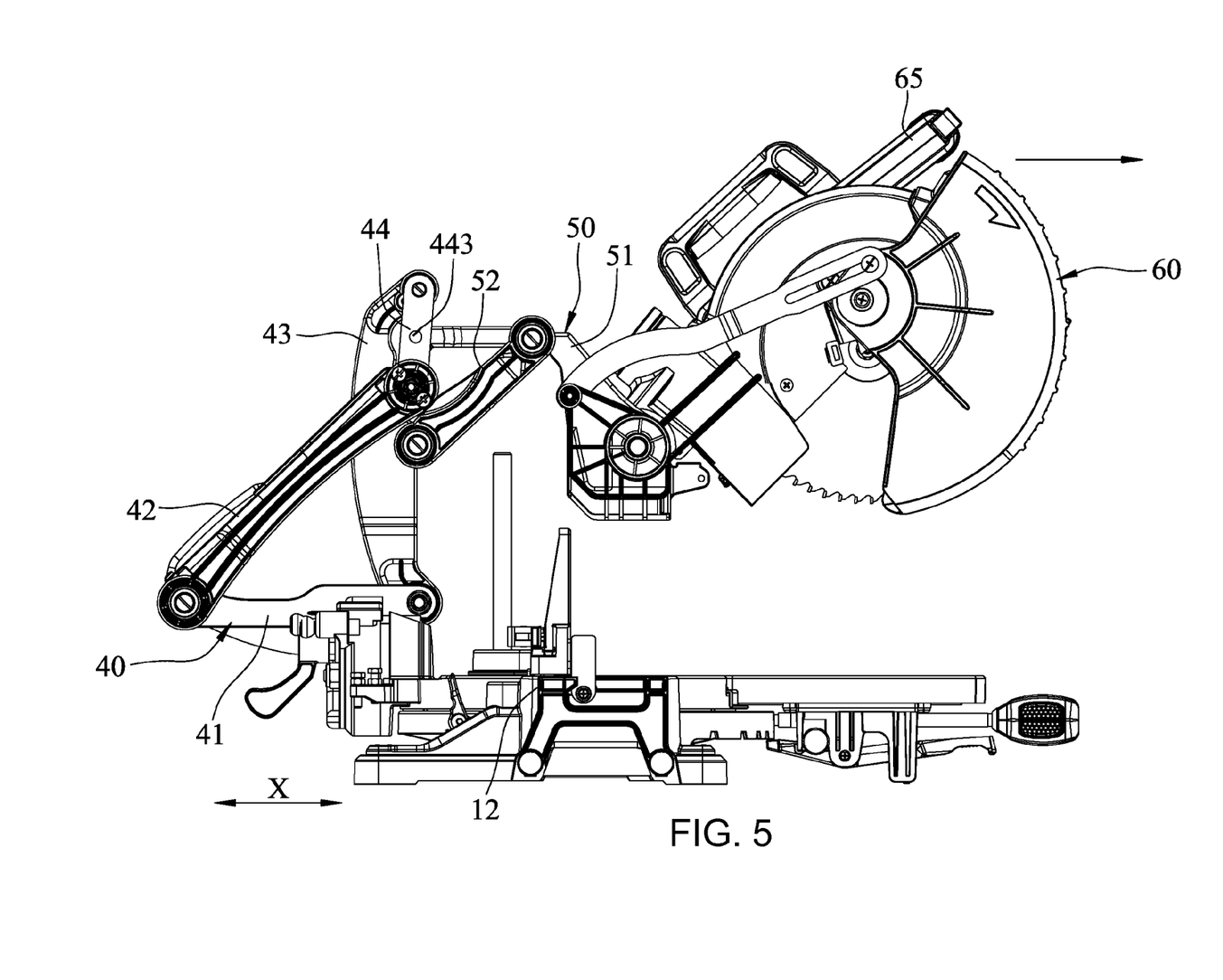
FIG. 5 is similar to FIG. 4, illustrating the cutting unit moved forwards according to the cutting stroke.

Thereafter, as shown in FIG. 5, the operator can carry the handle 65 forwardly along the horizontal axis X, thus moving the cutting unit 60 in the cutting stroke (in the direction indicated by the arrowhead). At this time, the cantilever arm 51 can drive the fourth link 44 of the linkage unit 40 and the connection member 52. Further, the fourth link 44 can be rotated on the axis of the coupling portion 443 through 180° to move the second link 42 forwardly and upwardly in a slightly tilted manner from the rear edge 12. Thus, the third link 43 and the fourth link 44 can be kept in a vertical position, and the cantilever arm 51 can be moved horizontally along the horizontal axis X, such that the cutting unit 60 is located in the ready position.

Figure 6:
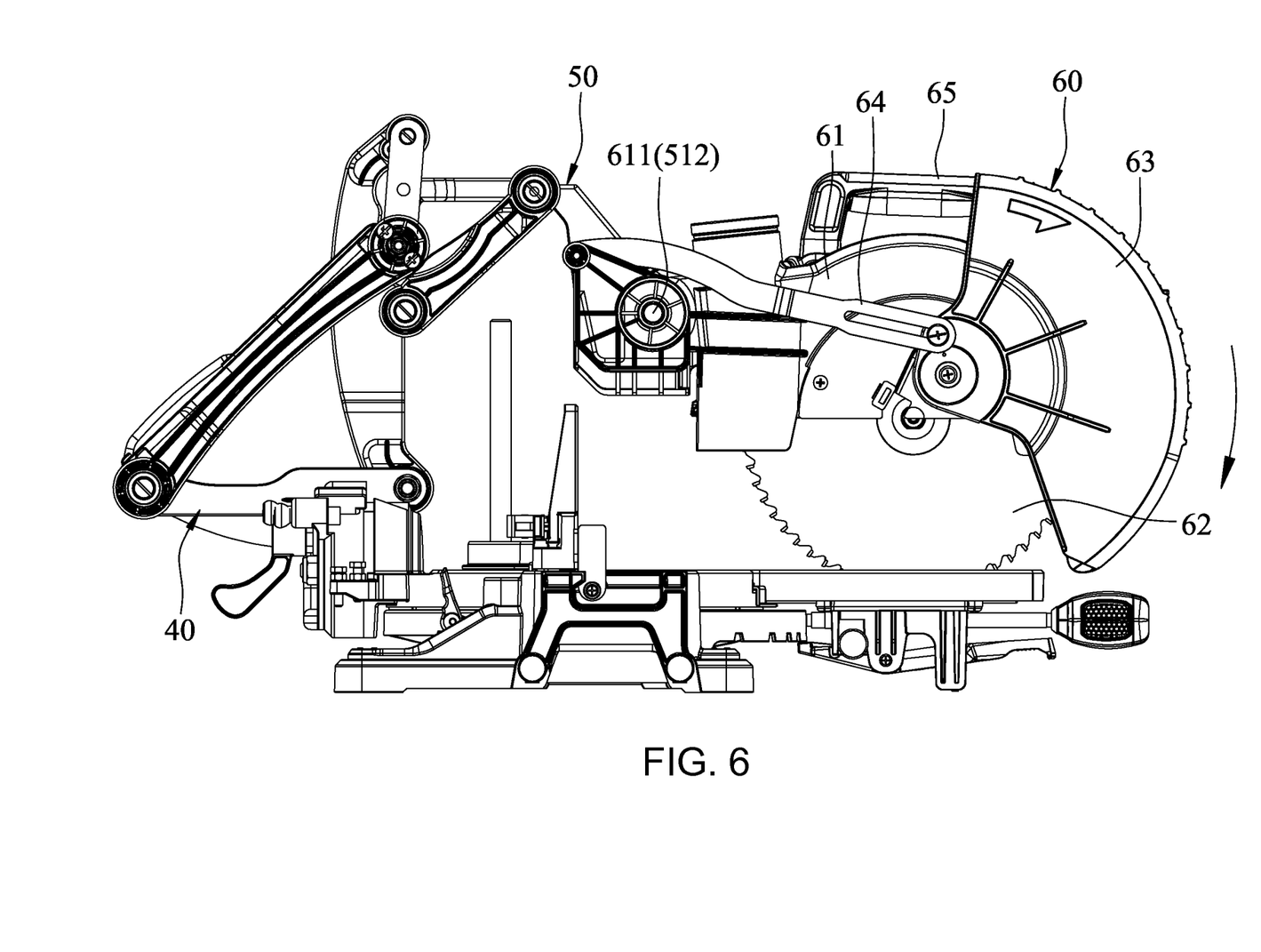
FIG. 6 is similar to FIG. 5, illustrating the cutting unit biased relative to the table into a cutting position.

Thereafter, as shown in FIG. 6, when the operator biases the cutting unit 60 downwards (in the direction indicated by the arrowhead) to turn the side end portion 611 of the cutting unit 60 downwardly about the axis of the pivot bearing portion 512, the pull bar 64 is forced to bias the saw blade guard 63 relative to the saw blade holder 61, thereby unshielding the saw blade 62. Thus, the saw blade 62 can be moved toward the workpiece (not shown) at the table 20.

When the operator exerts a force on the handle 65 in the direction toward the workpiece, the saw blade 62 is forced to cut the workpiece, and the multi-link miter saw can be returned to the configuration shown in FIG. 3 subject to linking between the cantilever arm 51 and the linkage unit 40.

As illustrated in FIGS. 3-6, subject to cooperation between the linkage unit 40 and the cantilever arm unit 50, the multi-point pivot connection arrangement between the cantilever arm 51 and connection member 52 of the cantilever arm unit 50 and the linkage unit 40 ensures a high level of structural stability during the movement of the cutting unit 60 in the cutting stroke. Thus, the cutting unit 60 can be operated to cut the workpiece stably without vibrations.

In conclusion, the invention makes use of the overall coordination, ensuring a high level of operating smoothness and stability and achieving the expected objects.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:
1. A multi-link miter saw, comprising:
a base comprising a front edge and an opposing rear edge;
a table mounted at said base, said table comprising an axle holder disposed at said rear edge;
a supporting unit disposed at said rear edge and connected to said axle holder of said table;
a linkage unit connected to said supporting unit and swingeable between said rear edge and said front edge;
a cantilever arm unit pivotally connected to said linkage unit, said cantilever arm unit comprising a cantilever arm pivotally connected to said linkage unit and a connection member pivotally connected between said cantilever arm and said linkage unit, said cantilever arm being drivable by said linkage unit and said connection member to move along a horizontal axis between said rear edge and said front edge; and a cutting unit comprising a saw blade holder pivotally connected to said cantilever arm unit, and a saw blade rotatably mounted in said saw blade holder, wherein said linkage unit comprises a first link connected to said supporting unit, a second link pivotally connected to said first link, a third link pivotally connected to said first link opposite to said second link, and a fourth link pivotally connected between said second link and said third link; said cantilever arm of said cantilever arm unit is pivotally connected to said fourth link of said linkage unit; said connection member is pivotally connected between said cantilever arm and said third link, and wherein said first link of said linkage unit comprises a first pivot-connection portion disposed adjacent to said axle holder, and a second pivot-connection portion disposed opposite to said first pivot-connection portion and pivotally connected to said second link; said third link comprises a lower pivot-connection portion pivotally connected to said first pivot-connection portion, an upper pivot-connection portion disposed opposite to said lower pivot-connection portion and pivotally connected to said fourth link, and a middle pivot-connection portion disposed between said lower pivot-connection portion and said upper pivot-connection portion and pivotally connected with said connection member.

2. A multi-link miter saw, comprising:

a base comprising a front edge and an opposing rear edge;

a table mounted at said base, said table comprising an axle holder disposed at said rear edge;

a supporting unit disposed at said rear edge and connected to said axle holder of said table;

a linkage unit connected to said supporting unit and swingeable between said rear edge and said front edge;

a cantilever arm unit pivotally connected to said linkage unit, said cantilever arm unit comprising a cantilever arm pivotally connected to said linkage unit and a connection member pivotally connected between said cantilever arm and said linkage unit, said cantilever arm being drivable by said linkage unit and said connection member to move along a horizontal axis between said rear edge and said front edge; and a cutting unit comprising a saw blade holder pivotally connected to said cantilever arm unit, and a saw blade rotatably mounted in said saw blade holder, wherein said linkage unit comprises a first link connected to said supporting unit, a second link pivotally connected to said first link, a third link pivotally connected to said first link opposite to said second link, and a fourth link pivotally connected between said second link and said third link; said cantilever arm of said cantilever arm unit is pivotally connected to said fourth link of said linkage unit; said connection member is pivotally connected between said cantilever arm and said third link, and wherein said cantilever arm of said cantilever arm unit comprises an interlocking portion pivotally connected to a middle part of said fourth link, a pivot bearing portion disposed opposite to said interlocking portion and pivotally connected with said cutting unit, and a pivot portion disposed between said interlocking portion and said pivot bearing portion; said connection member is pivotally connected between said middle pivot-connection portion and said pivot portion.

3. The multi-link miter saw as claimed in claim 2, wherein said cantilever arm of said cantilever arm unit further comprises an actuation portion disposed between said pivot bearing portion and said pivot portion; said cutting unit further comprises a saw blade guard rotatably pivoted to said saw blade holder, and a pull bar pivotally connected between said actuation portion and said saw blade guard; wherein said cutting unit is biasable relative to said cantilever arm unit from a ready position far from said table to a cutting position in close proximity to said table; wherein when said cutting unit is disposed in said ready position, said pull bar is operable to bias said saw blade guard relative to said saw blade holder for enabling said saw blade to be shielded by said saw blade guard; and when said cutting unit is disposed in said cutting position, said pull bar is operable to bias said saw blade guard relative to said saw blade holder and to further open said saw blade guard from said saw blade.

4. The multi-link miter saw as claimed in claim 3, wherein said cantilever arm of said cantilever arm unit further comprises opposing first and second sidewalls disposed around said pivot bearing portion, a substantially L-shaped panel connected between said first sidewall and said second sidewall, and an accommodation chamber surrounded by said first sidewall, said second sidewall and said L-shaped panel; said saw blade holder of said cutting unit comprises a side end portion inserted into said accommodation chamber and pivotally connected to said pivot bearing portion between said first sidewall and said second sidewall.

* * * * *